C. F. BURROUGHS & F. B. NORTHRUP.
DIES FOR POWER MOLDING PRESSES.
APPLICATION FILED SEPT. 23, 1913.
1,126,954.
Patented Feb. 2, 1915.
3 SHEETS—SHEET 3.
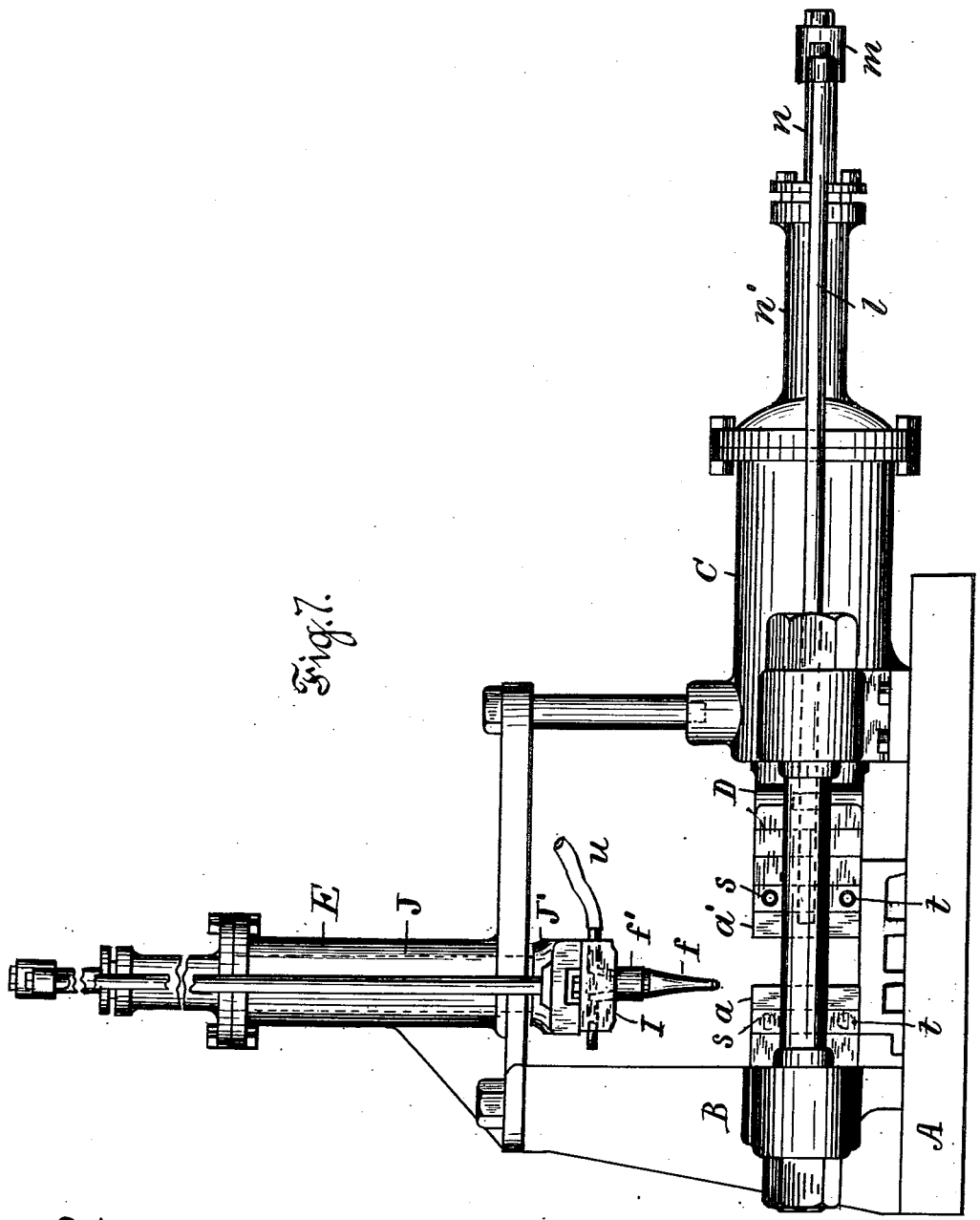

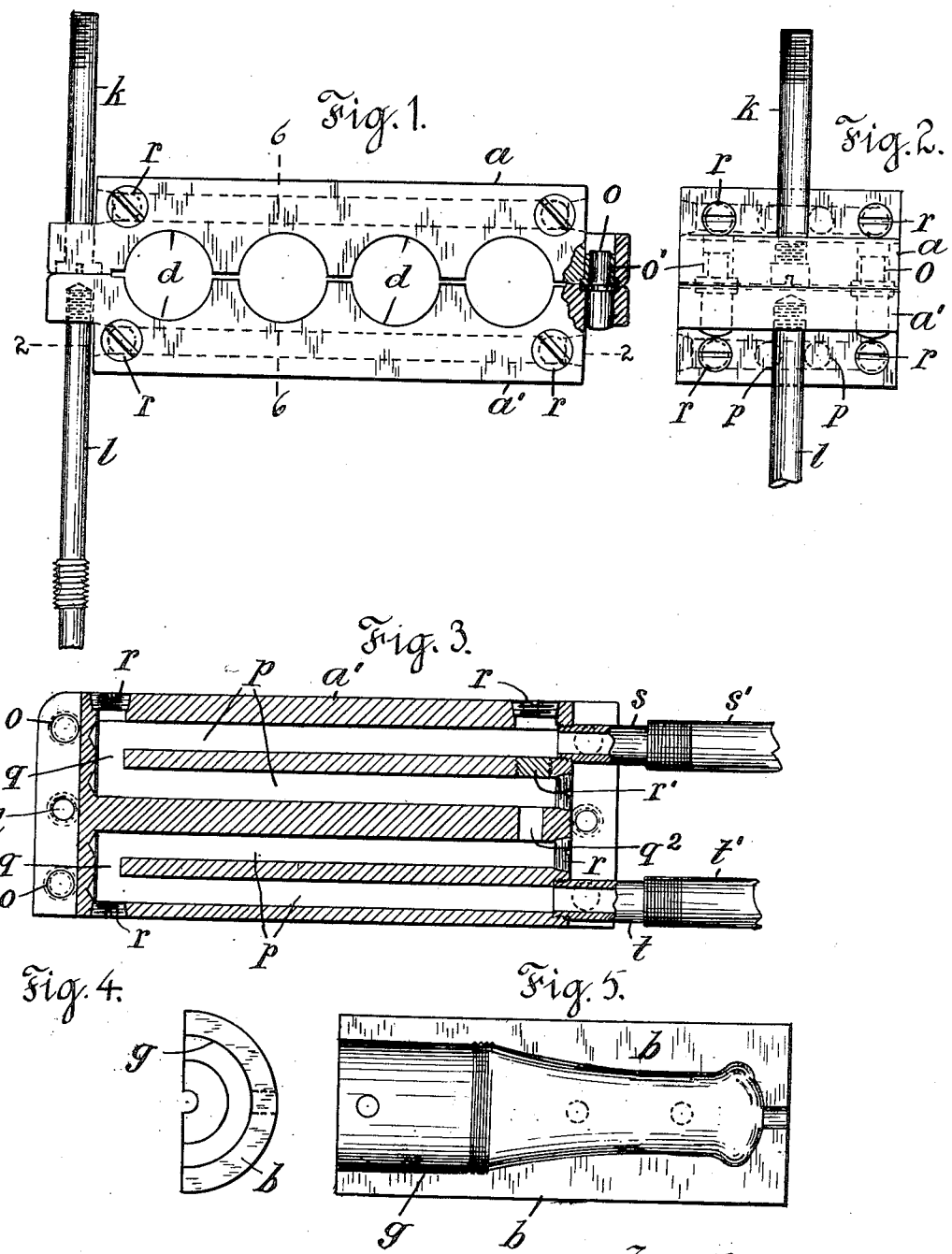

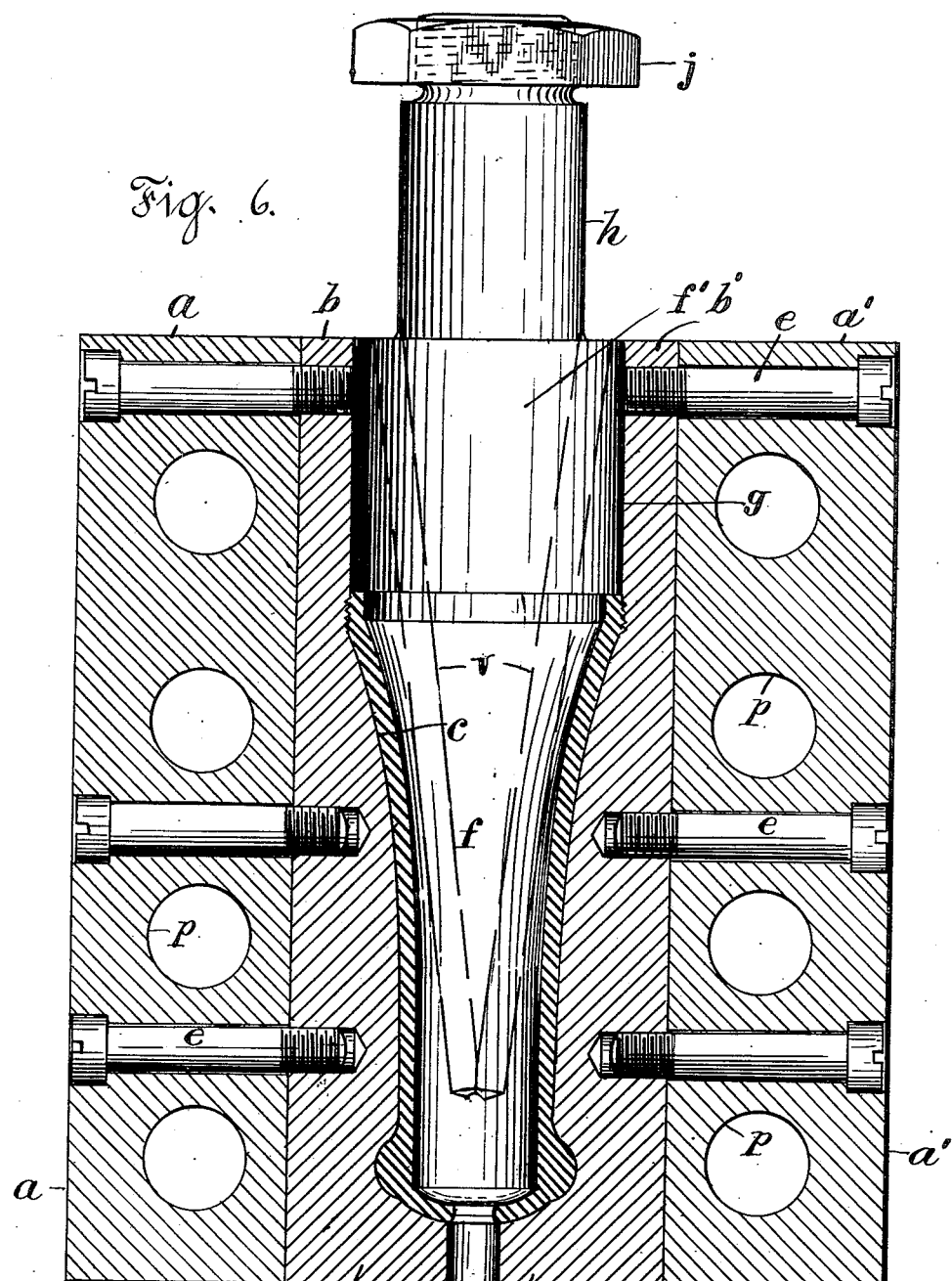

UNITED STATES PATENT OFFICE.

CHARLES F. BURROUGHS, OF EAST ORANGE, AND FRANCIS B. NORTHRUP, OF ORANGE, NEW JERSEY, ASSIGNORS TO THE CHARLES BURROUGHS COMPANY, OF NEWARK, NEW JERSEY, A CORPORATION OF NEW JERSEY.

DIES FOR POWER MOLDING-PRESSES.

1,126,954.

Specification of Letters Patent. Patented Feb. 2, 1915.

Application filed September 23, 1913. Serial No. 791,290.

*To all whom it may concern:*

Be it known that we, CHARLES F. BURROUGHS, residing at 122 Prospect street, East Orange, county of Essex, and State of New Jersey, and FRANCIS B. NORTHRUP, residing at 106 Day street, Orange, county of Essex, and State of New Jersey, both citizens of the United States, have invented certain new and useful Improvements in Dies for Power Molding-Presses, fully described and represented in the following specification and the accompanying drawings, forming a part of the same.

This invention relates to molds for power molding presses, in which a mold is formed of two dies or mold-parts complemental to one another and shaped to press plastic material between them to form some special article.

The invention consists partly of holders of special construction to support the mold-parts and move one to and from the other in the molding operations; partly in means for heating and cooling the holders so as to heat and cool the dies without removing them from the press in which they are operated; and partly in a special construction and operation of the dies with a core movable into and out of the dies, for pressing material therein to form a hollow article. In the drawings, we have illustrated a power molding press with which such dies are especially adapted to operate.

The invention will be understood by reference to the annexed drawing, in which—

Figure 1 is a plan and Fig. 2 an end view of die-holders for carrying complemental dies. Fig. 3 is a section, where hatched, on line 2—2 in Fig. 1; Fig. 4 is an end-view; and Fig. 5 a face-view of one of the dies removed from the holder. Fig. 6 is a cross section on line 6—6 in Fig. 1 upon an enlarged scale, with a core and plastic material represented in the mold; and Fig. 7 is a side elevation of a hydraulic angle-press showing the means for operating the dies and cores.

Die-holders $a$ and $a'$ are shown adapted each to receive complemental dies $b$ and $b'$, the dies shown having cylindrical exterior, as they are designed for molding the body $c$ of a telephone receiver, which is of circular section.

To hold such dies opposite one another in a working position, the die-holders are provided each with transverse circular grooves $d$ to fit the exterior of the dies, the grooves and the dies extending all the way across the depth of the holders, so that the bottom of the die may contact with a supporting-plate during the molding operation. Screws $e$ are shown extended through the holders into the dies to secure the same in the grooves $d$.

Two of the complemental dies form a mold, and the holder is shown with four molds and requires four cores to coöperate therewith.

A core $f$ is shown in Fig. 6 standing within the die and smaller than the same to leave a space for plastic material of suitable thickness to form the receiver-body $c$. Such core, when pressed into the dies, will simply displace the material without compressing the same, and could not accurately maintain its position therein without support, and such support and compression are effected in the present invention by forming the upper end of the die-cavity, above the mold, with a cylindrical bore and providing a cylindrical shank $f'$ upon the upper end of the core to fit such bore and move downward therein. Such shank operates to center the core in the mold, and also operates to compress the charge of material positively therein, so as to conform it accurately to the shape of the mold. For such a construction it is obvious that the dies require a considerably greater depth than is necessary for the mold of the article itself, to provide for the cylindrical bore into which the shank of the core moves downward during the molding operation.

The core is formed with a stem $h$ and a nut $j$ by which it may be secured in a head-block I upon a moving plunger J, as shown in Fig. 7. In this figure, a press is shown with bed A having an abutment B secured upon one end and a primary hydraulic cylinder C secured near the other end.

One of the holders $a$ is secured to the abutment by bolts $k$, and the holder $a'$ is secured to the head of the hydraulic plunger D by means of nuts and threads upon rods $l$ which are extended to a crosshead $m$ actuated by a plunger $n$ in an auxiliary cylinder $n'$. Only one of the bolts $k$ and rods $l$ is shown (at the left hand end) in Fig. 1, the flanges of the die-holders being shown in section at the right hand end to exhibit a dowel *o* upon the holder *a'* fitted to a bushing *o'* upon the holder *a*. Such a dowel is provided upon each corner of the holders and centers the complemental dies accurately opposite one another.

The auxiliary plunger J is carried in a cylinder E which is mounted at right angles to the axis of the primary cylinder C, and supported upon the frame of the press above the dies on a line with the joint or opening of the mold.

When the die-holder *a'* is moved toward the holder *a* by the plunger D, the cores *f* are thus opposite the opening of the molds and can be simultaneously forced therein by operating the plunger J. The die-holders are heated during the molding operation, and the particular construction of the die-holders and dies is especially favorable to the transmission of heat from the die-holders to the dies, as the circular grooves *d* in the die-holders contact with the entire exterior of the dies, and thus have a large surface through which heat can be transmitted. The die-holders also wholly inclose the dies, and thus prevent loss of heat therefrom by radiation.

For molding substances of high-resisting power, as vulcanite, celluloid and bakelite, dies and holders of steel are required, and the heating passages are therefore formed by drilling through the holder *a* a series of longitudinal holes *p* and connecting the ends of the holes alternately by drilling transverse passages *q* and $q^2$, so as to form a continuous tortuous channel for the steam or water.

The openings of the drill-holes upon the edges of the holder are closed by plugs *r* wherever necessary, and by plugs *r'* where the transverse holes intersect the metal between the longitudinal holes.

The end-holes of the series are provided with inlet-pipe *s* and outlet pipe *t* which are connected with steam and water supply by flexible or jointed pipes *s'* and *t'*. The dies may thus be heated by steam while molding the plastic material, and the steam then discharged and water circulated through the holders to cool the dies and chill the material before removing the pressed article from the mold. Where desired, the cores may also be heated by suitable means indicated by the pipe-connection *u* upon the head J' of the auxiliary plunger J. In such case, two connecting passages *v* would be drilled in the core, as indicated in Fig. 6, and the ends of such passages connected with channels in the head-block I, one of which may be supplied with steam or water by the pipe-connection *u*, and the other connected with a suitable waste.

The invention is especially applicable to the use of dies which may be formed with cylindrical exterior to fit in cylindrical sockets, as such sockets and the exterior of the dies may be fitted cheaply and accurately to one another by the ordinary methods of boring and turning. Such methods, as is well known, are the cheapest that can be employed for fitting two parts accurately together, and enable the semi-cylindrical grooves *d* in the two opposite die-holders to be simultaneously formed by a boring operation, and the exterior of two dies to be simultaneously turned to a perfect cylinder of the required dimensions to fit such sockets.

It will be observed in Fig. 1 that the die-holders have the sockets or grooves for the die-sections formed transversely in one side of the holders, and that the holes forming the steam passages are formed longitudinally of the holders so that they may be disposed at equal distance from each of the said sockets, and thus heat all of the dies equally. Such construction is especially advantageous where the dies are fitted removably in a die-holder and embraced by the die-holder in such manner as to convey the heat freely thereto. Dies having these constructive features are adapted for use in any suitable press, the one shown herein being only illustrative of the use of the dies.

The term "plastic material" as used herein, includes any composition or powder which is capable of yielding under pressure to conform to the walls of a mold, and it will be understood that although we have made special claim to the die-holders having semi-cylindrical cavity with cylindrical mold-parts fitted thereto, we do not limit ourselves to such form of fitting between the holder and the mold-parts, as it is necessary to use molds having great variety of forms, many of which for molding broad or flat articles could not economically be formed with cylindrical exterior to fit a holder with cylindrical cavity.

Having thus set forth the nature of the invention what is claimed herein is:

1. In a power molding press, the combination, with die-holders provided with opposed semi-cylindrical mold-cavities extending throughout the entire depth of the holders, and means to center the holders upon one another, of complemental mold-parts with cylindrical exterior secured in the said cavities, flush with the lower ends of the same, to rest upon a separate bed-plate.

2. In a power molding press, the combination, with die-holders provided with opposed transverse semi-cylindrical mold receiving cavities and dowels to center the said holders, of complemental mold-parts with cylindrical exterior secured in the said cavities and having each a mold chamber in its lower part and a cylindrical guide-bore in its upper part, and a movable core adapted to enter between the mold-parts and clear the same to mold a hollow shell therein, and having a cylindrical shank fitted movably to the said guide-bore and operating to center the core in the mold and also to press the charge of material therein.

In testimony whereof we have hereunto set our hands in the presence of two subscribing witnesses.

CHARLES F. BURROUGHS.
FRANCIS B. NORTHRUP.

Witnesses:
FRANK L. MORTON,
ALBERT V. BOUGHNER.